Figure 1:
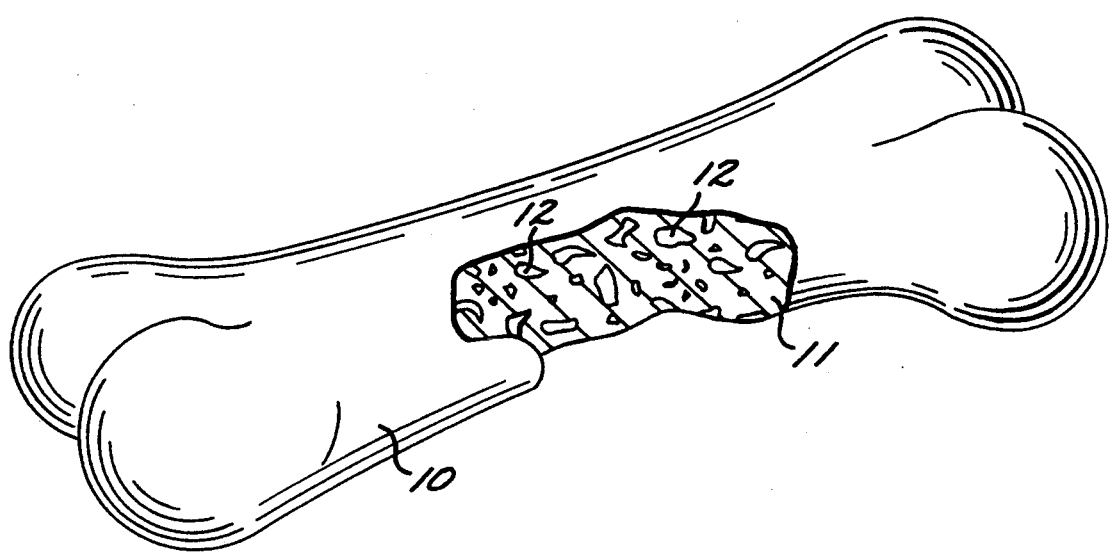

United States Patent [19]
Axelrod

[11] Patent Number: 5,339,771
[45] Date of Patent: Aug. 23, 1994

[54] ANIMAL CHEW TOY CONTAINING ANIMAL MEAL

[76] Inventor: Herbert R. Axelrod, 6 Marine Pl., Deal, N.J. 07753

[21] Appl. No.: 121,785

[22] Filed: Sep. 15, 1993

[51] Int. Cl.5 .............................................. A01K 29/00
[52] U.S. Cl. .................................... 119/710; 119/711; 426/805
[58] Field of Search ............... 119/702, 707, 708, 709, 119/710, 711; 426/805

[56] References Cited

U.S. PATENT DOCUMENTS

| | | | |
|---|---|---|---|
| 1,149,710 | 8/1915 | Allis | 119/710 |
| 2,988,045 | 6/1961 | Fisher | 119/709 |
| 3,123,047 | 3/1964 | Fisher | 119/709 |
| 3,441,001 | 4/1969 | Fisher | 119/709 |
| 3,871,334 | 3/1975 | Axelrod | 119/710 |
| 4,364,926 | 12/1982 | Fisher | 119/710 |
| 4,513,014 | 4/1985 | Edwards | 119/710 |
| 4,674,444 | 6/1987 | Axelrod | 119/710 |
| 4,928,632 | 5/1990 | Gordon | 119/709 |

FOREIGN PATENT DOCUMENTS 2083217 12/1971 France ............................. 119/710

*Primary Examiner*—Paul J. Hirsch
*Attorney, Agent, or Firm*—Fulwider Patton Lee & Utecht

[57] ABSTRACT

A chew toy for pets which is made from a molded synthetic thermoplastic having animal meal dispersed in the plastic.

1 Claim, 1 Drawing Sheet

ANIMAL CHEW TOY CONTAINING ANIMAL MEAL

This invention relates to a chew toy for pets.

More particularly, the invention concerns a chew toy for dogs which is appealing to the dog and excites its chewing instincts.

In yet another respect, the invention pertains to an improved dog chew toy such as an artificial bone, tugging ring, ball or retrieving object, which is specially formulated and fabricated to appeal to and excite the animal's chewing instincts.

Artificial bones, teething toys, etc., which contain components for exciting the animal's interest and chewing instincts are well known in the art. For example, U.S. Pat. No. 1,149,170 to Allis discloses an animal toy formed by impregnating a fibrous substrate such as rubberized canvas or a woven vegetable or mineral fiber with a substance such as saccharin. Other examples of such products are disclosed in U.S. Pat. No. 3,871,334 to Axelrod (nylon substrate containing liquid flavor and odor components); U.S. Pat. No. 4,771,733 to Axelrod (polyurethane toy containing aqueous-based flavor and odor components); U.S. Pat. No. 4,557,219 to Edwards (polyurethane toy containing aromatic oily extracts and nonfunctional additives such as pigments, blowing agents, fillers, etc.); U.S. Pat. No. 4,513,014 to Edwards (polyurethane dog bone with surface-migrating oil-based flavor or aroma extracts); U.S. Pat. No. 4,674,444 to Axelrod (nylon chew toy with a layer of caramelized sugar just below its surface and which may also contain other aqueous meat scents and flavors); U.S. Pat. No. 5,100,651 to Boyer (oxhide strip impregnated with water soluble active constituents such as anti-decay agents and anti-microbial agents); U.S. Pat. No. 5,033,410 to Sigurdsson (polyethylene fibers impregnated by boiling in a flavoring media such as cod liver oil or beef broth).

To date, however, it has not been known in the art to incorporate animal meal such as poultry meal, beef meal, horse meat meal or fish meal into a molded synthetic thermoplastic matrix of the type which is conventionally employed in forming animal chew toys in accordance with the above-cited prior art. A canine biscuit containing meat byproducts and farinaceous materials or textured vegetable protein distributed through a dog biscuit dough is disclosed in U.S. Pat. No. 4,546,001 to Gellman et al. An animal food product consisting of structure-supporting fibers formed of collagen, or cellulosic material, containing dried meats, food additives and vitamin, mineral or medicinal supplements is disclosed in U.S. Pat. No. 4,364,925 to Fisher.

The principal object of the present invention is to provide an improved pet chew toy.

Yet another object of the invention is to provide an improved pet chew toy which provides improved excitation of the animal's chewing instinct and which causes the animal to retain interest in chewing the object for an extended period of time.

These, other and further objects and advantages of the invention will be apparent to those skilled in the art from the following detailed description thereof, taken in conjunction with the drawing in which FIG. 1 is a partially cut away sectional view of an artificial dog bone fabricated in accordance with presently preferred embodiment of the invention.

Briefly, in accordance with my invention, I provide an animal chew toy comprising a shaped article which is formed of a molded synthetic thermoplastic matrix and of animal meal dispersed in this matrix.

The synthetic thermoplastic resins which can be employed in the practice of my invention include those which have been heretofore employed in manufacturing synthetic plastic animal chew toys, including, for example, nylon, polyurethane, and mixtures thereof. Examples of animal meal which can be employed in the practice of my invention include commercially available meals made from fish, poultry, beef and horse meat and/or bones. Such meals are conventionally employed in manufacturing various pet foods. For example, in the presently preferred embodiment of the invention, I am employ chicken meal dispersed in a nylon-polyurethane matrix.

The proportion of animal meal which is dispersed in the thermoplastic matrix is not critical and can be varied within wide limits. For example, I can employ from about ¼ to about 5% weight percent of animal meal, preferably from about one to five percent.

The chew toys of the present invention are manufactured by adding the animal meal to the thermoplastic matrix material before molding, mixing the meal and thermoplastic material, heating the resulting mixture to or just above the melting temperature of the thermoplastic, and then forming the resulting melt into the desired shaped article by conventional thermoplastic molding techniques.

The following example is presented to further illustrate to persons skilled in the art how to make and use the invention and to identify the presently preferred embodiment thereof. This example is not intended as a limitation, however, upon the scope of the invention, which is defined only by the appended claims.

EXAMPLE

Commercial chicken meal is sifted to remove particles greater than 30 mesh which would clog the extrusion nozzle of the plastic molding machine. One pound of the sifted meal is mixed with 100 pounds of polyurethane beads and mixed in a rotating drum. The mixed animal meal/plastic beads are fed into a mechanically agitated hopper on an injection molding machine. The mixture is fed into a heater to melt the thermoplastic beads. Part of the animal meal becomes transparent upon heating but other parts, which include bone fragments, remain as visible discrete particles. The resultant mixture is extruded into bone-shaped dog chew toys as depicted in FIG. 1.

As shown in FIG. 1, the extruded toys 10 consists of a matrix of solid thermoplastic 11 with visible particles of the animal meal 12 dispersed throughout this matrix.

Having described my invention in such terms as to enable those skilled in the art to make and use it, and having identified the presently preferred embodiment thereof, I claim:

1. An animal chew toy, comprising a shaped article formed of
   a. a molded synthetic thermoplastic matrix; and
   b. unencapsulated particulate animal meal dispersed substantially uniformly throughout said matrix.

* * * * *